United States Patent [19]

Inoue et al.

[11] Patent Number: 5,652,315
[45] Date of Patent: Jul. 29, 1997

[54] METHOD FOR PREPARING ETHYLENE COPOLYMER

[75] Inventors: Norihide Inoue, Kanagawa-ken; Tetsunosuke Shiomura, Tokyo; Masahiro Kouno, Kanagawa-ken, all of Japan

[73] Assignee: Mitsui Toatsu Chemicals, Inc., Tokyo, Japan

[21] Appl. No.: 663,596

[22] Filed: Jun. 14, 1996

Related U.S. Application Data

[63] Continuation of Ser. No. 443,392, May 17, 1995, abandoned, which is a continuation of Ser. No. 68,086, May 28, 1993, abandoned.

[30] Foreign Application Priority Data

Jun. 4, 1992 [JP] Japan .................. 4-143941

[51] Int. Cl.⁶ .................................. C08F 4/642
[52] U.S. Cl. ............... 526/153; 526/160; 526/170; 526/347; 526/943; 502/117; 556/52
[58] Field of Search .................. 526/153, 160, 526/170, 347, 943

[56] References Cited

U.S. PATENT DOCUMENTS

| | | | |
|---|---|---|---|
| 2,952,670 | 9/1960 | Fischer | 526/160 |
| 4,542,199 | 9/1985 | Kaminsky et al. | 526/160 |
| 4,769,510 | 9/1988 | Kaminsky et al. | 585/512 |
| 4,952,540 | 8/1990 | Koika et al. | 502/9 |
| 4,990,640 | 2/1991 | Tsutsui et al. | 556/181 |
| 5,055,438 | 10/1991 | Canich | 502/117 |
| 5,155,080 | 10/1992 | Elder et al. | 502/152 |
| 5,171,799 | 12/1992 | Kioka et al. | 26/127 |
| 5,225,501 | 7/1993 | Fujita et al. | 526/127 |
| 5,229,478 | 7/1993 | Floyd et al. | 526/160 |
| 5,252,529 | 10/1993 | Ueda et al. | 502/113 |
| 5,260,394 | 11/1993 | Tazaki et al. | 526/347 |
| 5,340,892 | 8/1994 | Kuramoto | 526/119 |
| 5,543,484 | 8/1996 | Chung et al. | 526/347.1 |

FOREIGN PATENT DOCUMENTS

| | | |
|---|---|---|
| 452920 | 10/1991 | European Pat. Off. . |
| 511665 | 11/1992 | European Pat. Off. . |
| 2-247201 | 10/1990 | Japan . |
| 2-274703 | 11/1990 | Japan . |
| 2-274704 | 11/1990 | Japan . |
| 3-103407 | 4/1991 | Japan . |
| 3-250007 | 11/1991 | Japan . |
| 4-69394 | 3/1992 | Japan . |
| WO88/05792 | 8/1988 | WIPO . |
| WO88/05793 | 8/1988 | WIPO . |

OTHER PUBLICATIONS

"Metallocene Catalysts," W. Kamisky, SP '92–Polyethylene World Congress, Zürich, 1992, Entire document.

Zambelli et al., "Isotactic Polymerization of Propene: Homogeneous Catalysts Based on Group 4 Metallocenes without Methylalunoxane," ACS, *Macromolecules*, pp. 2186–2189 (1989).

Kaminsky et al., "Isotactic Polymerization of Olefins with Homogeneous Zirconium Catalysts," Transitional Metals and Organometallics as Catalysts for Olefin Polymerization, Springer–Verlag, Berlin, 1983, pp. 291–301.

*Hawley's Condensed Chemical Dictionary*, 11th Ed., Van Nostrand Reinhold, New York, 1987, p. 854.

Polymer Science USSR, vol. 34, No. 1, 1992, "Synthesis and Structure of Homo and Copolymers of Ethylene With Other X–Olefins Prepared Using Zirconeces Dichloride Derivatives and Methylaluminoxane . . . ", pp. 76–80.

Polymer Bulletin 20, 237–241 (1988).

*Primary Examiner*—Romulo H. Delmendo
*Attorney, Agent, or Firm*—Burns, Doane, Swecker & Mathis

[57] ABSTRACT

A method for preparing an ethylene copolymer which comprises the step of copolymerizing ethylene with an aromatic vinyl compound in the presence of a catalyst comprising (A) a specific transition metal compound represented by the formula I

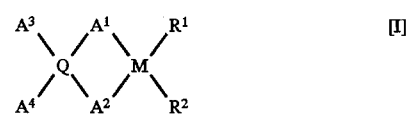

and (B) a cocatalyst such as an aluminoxane.

13 Claims, 1 Drawing Sheet

METHOD FOR PREPARING ETHYLENE COPOLYMER

This application is a continuation of application Ser. No. 08/443,392, filed May 17, 1995, now abandoned, which is a continuation of application Ser. No. 08/068,086, filed on May 28, 1993 now abandoned.

BACKGROUND OF THE INVENTION (a) Field of the Invention

The present invention relates to a method for preparing an ethylene copolymer. More specifically, it relates to a method for preparing an ethylene-aromatic vinyl compound copolymer.

(b) Description of the Prior Art

It is known that a copolymer of ethylene and an aromatic vinyl monomer such as an ethylene-styrene copolymer can be obtained by the use of the so-called Ziegler catalyst [e.g., refer to Polymer Bulletin, 20, p. 237 (1988)]. In this method, however, the polymerization activity of the catalyst is low, and the content of the aromatic vinyl monomer in the obtained copolymer is also low.

Furthermore, it is also known that the ethylene-styrene copolymer can be obtained by the hydrogenation of a poly(phenylbutadiene), but from a practical viewpoint, it is desired to develop a catalyst which permits the direct copolymerization of ethylene and styrene.

Japanese Patent Laid-open No. 250007/1991 discloses a method for preparing an ethylene-aromatic vinyl compound alternative copolymer by the use of a catalyst comprising a specific transition-metal compound and an aluminoxane.

As described above, the ethylene-aromatic vinyl compound copolymer has become easily prepared by the use of the specific catalyst, and for this reason, various applications of the copolymer utilizing its physical properties are expected. Moreover, it is expected to develop an improved catalyst having a copolymerization activity of ethylene with an aromatic vinyl compound.

SUMMARY OF THE INVENTION.

An object of the present invention is to provide a method for preparing an ethylene-aromatic vinyl compound copolymer in a good yield.

Other objects of the present invention will be apparent from the following description.

The present inventors have intensively researched and investigated catalysts having a copolymerization activity of ethylene with an aromatic vinyl compound, and as a result, they have found that the above-mentioned objects can be achieved by using a specific metallocene compound. In consequence, the present invention has now been completed.

A method for preparing an ethylene copolymer of the present invention comprises the step of copolymerizing ethylene with an aromatic vinyl compound in the presence of a catalyst comprising (A) a transition metal compound represented by the formula I

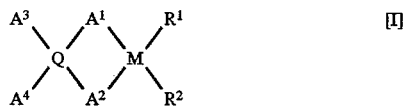

(wherein each of $A^1$ and $A^2$ is an unsubstituted or substituted cyclopentadienyl group, indenyl group or fluorenyl group; each of $A^3$ and $A^4$ is a hydrogen atom, an alkyl group having 1 to 10 carbon atoms, an aryl group, alkylaryl group, arylalkyl group or halogenated aryl group having 6 to 20 carbon atoms, or a hydrocarbon group having 1 to 20 carbon atoms and containing a hetero-atom selected from the group consisting of oxygen, nitrogen, sulfur and silicon; Q which couples with $A^1$ and $A^2$ is a hydrocarbon group having 2 to 10 carbon atoms, a hydrocarbon group having 1 to 10 carbon atoms and containing silicon, germanium or tin, or a carbon, silicon, germanium or tin atom, and $A^3$ and $A^4$ may combine with each other to form a ring structure comprising $A^3$, $A^4$ and Q; each of $R^1$ and $R^2$ is a halogen atom, a hydrogen atom, an alkyl group having 1 to 10 carbon atoms, or an aryl group, alkylaryl group or arylalkyl group having 6 to 20 carbon atoms; and M is titanium, zirconium or hafnium) and (B) a cocatalyst.

DESCRIPTION OF THE PREFERRED EMBODIMENTS

Figure 1:
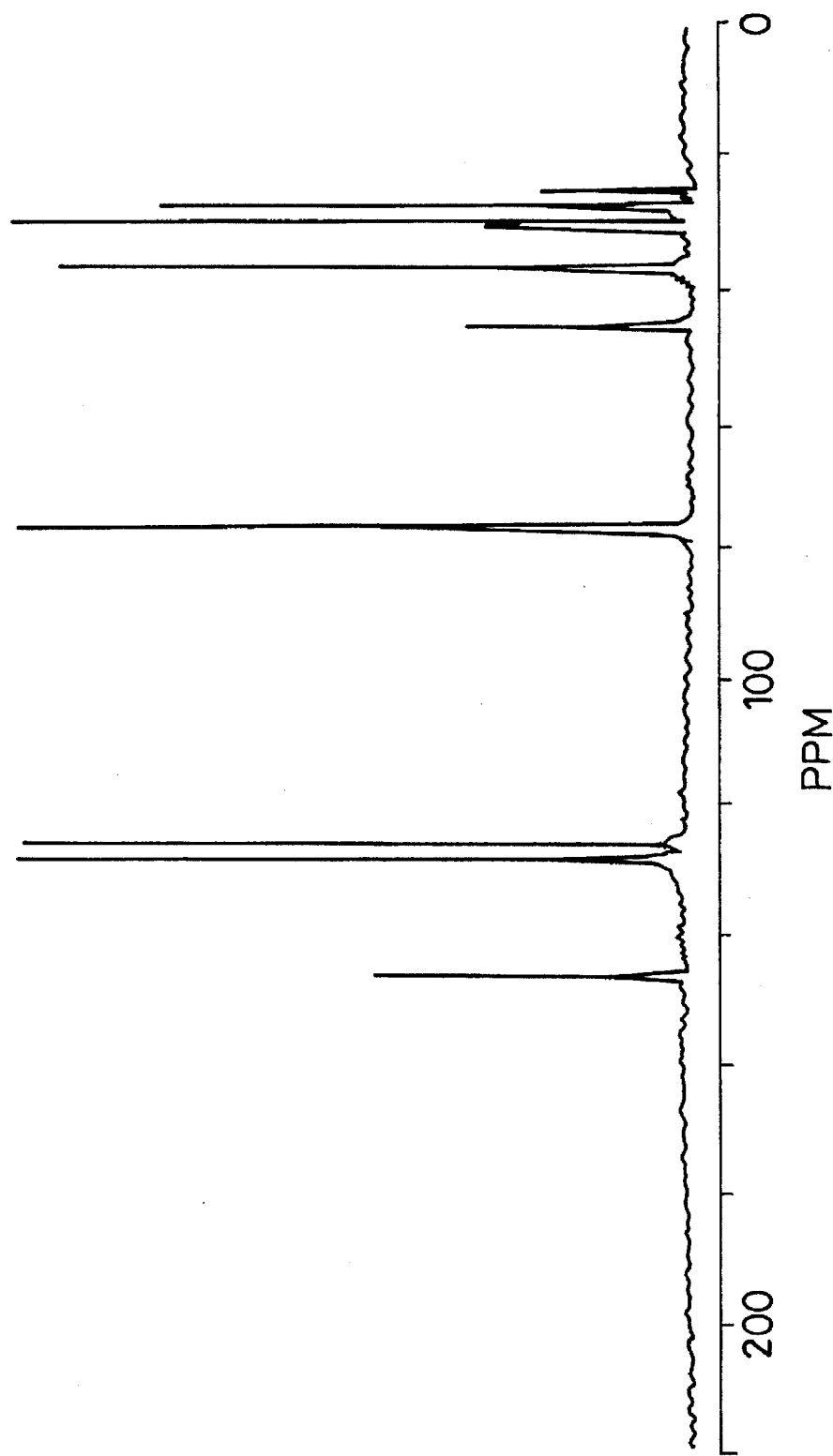
FIG. 1 shows a $^{13}$C-NMR spectrum of a copolymer obtained in Example 1.

In the formula I representing a transition metal compound which is used as one component of a catalyst in the present invention, each of $A^1$ and $A^2$ is an unsubstituted or substituted cyclopentadienyl group, indenyl group or fluorenyl group. Typical examples of $A^1$ and $A^2$ include a cyclopentadienyl group, methylcyclopentadienyl group, dimethylcyclopentadienyl group, tetramethylcyclopentadienyl group, indenyl group, 3-methylindenyl group, tetrahydroindenyl group, fluorenyl group, methylfluorenyl group and 2,7-di-tert-butylfluorenyl group.

In the formula I, each of $A^3$ and $A^4$ is a hydrogen atom, an alkyl group having 1 to 10 carbon atoms, an aryl group having 6 to 20 carbon atoms, an alkylaryl group having 6 to 20 carbon atoms, an arylalkyl group having 6 to 20 carbon atoms, halogenated aryl group having 6 to 20 carbon atoms, or a hydrocarbon group having 1 to 20 carbon atoms and containing a hetero-atom such as oxygen, nitrogen, sulfur or silicon. Typical examples of $A^3$ and $A^4$ include a hydrogen atom, methyl group, ethyl group, propyl group, phenyl group, toluyl group, fluorophenyl group, methoxyphenyl group and benzyl group.

Q which couples with $A^1$ and $A^2$ is a hydrocarbon group having 2 to 10 carbon atoms, a hydrocarbon group having 1 to 10 carbon atoms and containing silicon, germanium or tin, or a carbon, silicon, germanium or tin atom. Preferably, Q is the hydrocarbon group having 2 to 10 carbon atoms, a carbon atom or silicon atom. Furthermore, $A^3$ and $A^4$ may combine with each other to form a ring structure comprising $A^3$, $A^4$ and Q. In this case, examples of the group comprising $A^3$, $A^4$ and Q include a cyclopentylidene group, cyclohexylidene group and tetrahydropyran-4-ylidene group.

Each of $R^1$ and $R^2$ is a halogen atom, a hydrogen atom, an alkyl group having 1 to 10 carbon atoms, an alkyl group having silicon, or an aryl group, alkylaryl group or arylalkyl group having 6 to 20 carbon atoms. Preferable typical examples of $R^1$ and $R^2$ include a chlorine atom, methyl group, phenyl group and trimethylsilyl group.

A metallocene compound represented by the formula I in the present invention is characterized by having a crosslinkable ligand. The employment of such a metallocene compound allows the copolymerization of ethylene and the aromatic vinyl compound to proceed. Suitable examples of the metallocene compound having the crosslinkable ligand which can be used in the present invention include metallocene compounds mentioned in U.S. Pat. Nos. 4,769,510 and 4,892,851 as well as Japanese Patent Laid-open Nos. 274703/1990, 274704/1990 and 69394/1992.

Typical examples of the metallocene compound include ethylenebis(1-indenyl)zirconium dichloride, ethylene-bis(tetrahydro-1-indenyl)zirconium dichloride, isopropylidene(cyclopentadienyl)(fluorenyl)zirconium dichloride, methylphenylmethylene(cyclopentadienyl)(fluorenyl)zirconium dichloride and diphenylmethylene(cyclopentadienyl)(fluorenyl)zirconium dichloride.

In the present invention, a known cocatalyst can be used as a component (B) in combination with the metallocene compound. Known aluminoxanes are preferable examples of the cocatalyst. In addition, other usable examples of the cocatalyst include compounds which can stabilize cationic transition metal complexes mentioned in WO 88 05792, WO 88 05793 and U.S. Pat. No. 5,155,080. Furthermore, as compounds which can stabilize the cationic transition metal complexes, compounds showing Lewis acid properties and solid acids can also be used. Preferred examples of the compounds showing Lewis acid properties include compounds containing elements in the group III a of the periodic table such as triphenylboron, tris(pentafluorophenyl)boron and triphenyl aluminum. Examples of the solid acid include magnesium chloride, aluminum chloride and alumina.

The aluminoxanes are compounds represented by the formulae II and III

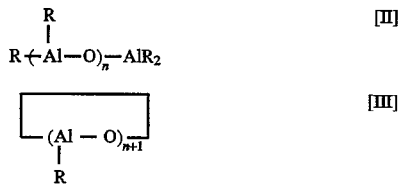

(wherein R is a hydrocarbon group, particularly, an alkyl group having 1 to 10 carbon atoms, and n is an integer of 2 or more, preferably an integer of from 2 to 100), and in the aluminoxane which can be particularly preferably used, R is a methyl group and n is 5 or more, preferably 10 or more. Even if the aluminoxane is contaminated with a small amount of an alkyl aluminum compound, there is no problem. Further, aluminoxanes having two or more kinds of alkyl groups mentioned in Japanese Patent Laid-open Nos. 247201/1990 and 103407/1991, a fine particle aluminoxane mentioned in U.S. Pat. No. 4,952,540 and aluminum oxy-compounds obtained by bringing into contact with a compound containing active hydrogen such as water and alcohols mentioned in U.S. Pat. Nos. 5,171,799 and 4,990,640 can also be used.

In the present invention, the amount of a cocatalyst such as the aluminoxane is usually from 1 to 100000 moles, preferably from 10 to 10000 moles per mole of the above-mentioned transition metal compound.

In the present invention, the transition metal compound and/or a cocatalyst such as the aluminoxane may be used as is, or may be carried on a known carrier such as $SiO_2$, $Al_2O_3$ or $MgCl_2$ which is used in a conventional Ziegler catalyst.

Furthermore, the catalyst comprising the transition metal compound and the cocatalyst which can be used in the present invention can be used in the presence of an organic aluminum compound, if necessary. In this case, the ethylene copolymer can be produced in a smaller amount of the aluminoxane.

The usable organic aluminum compound can be represented by the formula IV $$R'_j Al(OR'')_k H_l X_m \qquad (IV)$$

(wherein each of R' and R" is a hydrocarbon group having 1 to 20 carbon atoms, and R' and R" may be mutually identical or different; X is a halogen atom; j is an integer of from 1 to 3; each of k, l and m is an integer of from 0 to 2, and j+k+l+m=3).

Typical examples of the organic aluminum compound include trimethyl aluminum, triethyl aluminum, triisobutyl aluminum, diethyl aluminum chloride, ethyl aluminum dichloride and diisobutyl aluminum hydride. Above all, trimethyl aluminum and triisobutyl aluminum are suitably used.

The amount of the organic aluminum compound is preferably from 1 to 1000 moles, more preferably from 50 to 500 moles per mole of the transition metal compound.

The important conception of the present invention is that an ethylene-aromatic vinyl compound copolymer can be prepared by polymerizing ethylene with at least one aromatic vinyl compound.

Examples of the aromatic vinyl compound which can be used in the present invention include styrene; o-methylstyrene, p-methylstyrene, o,p-dimethylstyrene, o-ethylstyrene, m-ethylstyrene, p-ethylstyrene, o-chlorostyrene, p-chlorostyrene and α-methylstyrene.

No particular restriction is put on the polymerization process and polymerization conditions in the present invention, and a known process for use in a usual olefin polymerization can be employed. A solvent polymerization using an inert hydrocarbon solvent, a bulk polymerization which is carried out under substantially inert hydrocarbon-free conditions, or a gaseous phase polymerization can be utilized. Polymerization temperature is in the range of from −100° to 200° C. preferably from −50° to 100° C. and polymerization pressure is in the range of from atmospheric pressure to 100 kg/cm², preferably from atmospheric pressure to 50 kg/cm².

Examples of the hydrocarbon solvent which can be used in the polymerization of the present invention include saturated hydrocarbons such as butane, pentane, hexane, heptane, octane, nonane, decane, cyclopentane and cyclohexane, and aromatic hydrocarbons such as benzene, toluene and xylene.

The ethylene-aromatic vinyl compound copolymer obtained by the method of the present invention contains 0.1 to 50 mole %, preferably 1 to 45 mole % of an aromatic vinyl compound unit. This kind of copolymer is a random copolymer which is free from a chain of the aromatic vinyl compounds combined with each other.

Heretofore, it is known that the ethylene-aromatic vinyl compound copolymer, for example, ethylene-styrene copolymer can be obtained by copolymerizing butadiene with styrene in accordance with an anionic polymerization technique, and then hydrogenating the resultant polymer. However, in the thus obtained copolymer, a styrene-styrene chain is present, and therefore the copolymer is poor in compatibility with another resin. For this reason, the applications of the copolymer are limited.

On the contrary, the copolymer obtained by the method of the present invention is a random copolymer as described above, and therefore the copolymer which is excellent in transparency, flexibility and compatibility with another resin such as polypropylene can be produced by suitably selecting the content of the aromatic vinyl compound unit.

Furthermore, in copolymerizing with a diene for the purpose of modifying the polymer, the solvent which can be used in the method of the present invention can be applied. Examples of the diene compound which can be used for such a purpose include 1,4-hexadiene, 4-methyl-1,4-hexadiene, ethylidenenorbornene and dicyclopentadiene.

Now, the present invention will be described in more detail in reference to examples. It should be noted that the scope of the present invention is not limited to these examples.

A $^{13}$C-NMR spectrum of each polymer was measured in a chloroform-d solution at 27° C. by the use of an FX-100 spectrometer made by JEOL, Ltd. The attribution of the spectrum was carried out in the light of the attribution of Japanese Patent Application Laid-open No. 250007/1991.

EXAMPLE 1

In a 100 cm$^3$ glass flask sufficiently purged with a nitrogen gas were placed 30 cm$^3$ of toluene, 20 mg of isopropylidene(cyclopentadienyl)( 9-fluorenyl)zirconium dichloride synthesized as described in U.S. Pat. No. 4,892, 851, 2.7 g of methyl aluminoxane purchased from Toso Akzo Co., Ltd. and 9.1 g of styrene in turn. After the temperature in the system was adjusted to 40° C., ethylene was fed to the flask to start polymerization. After the polymerization was carried out for one hour, a small amount of methanol was added to the system to terminate the polymerization. Next, the resultant reaction product was poured into a large amount of methanol/hydrochloric acid to precipitate the polymer. The thus precipitated polymer was washed with methanol and then dried to obtain 12.2 g of a rubbery-like polymer.

An intrinsic viscosity ([η]) of the resulting polymer measured in a tetralin solution at 135° C. was 0.26 dl/g. Furthermore, this polymer was analyzed by measuring $^{13}$C-NMR. As a result, a peak was not observed at 42–44 ppm, which meant that any styrene-styrene chain was not present in the polymer, and it was apparent that the polymer was ethylene-styrene random copolymer having a styrene content of 22.6 mole %. The $^{13}$C-NMR spectrum of this polymer is shown in FIG. 1.

Comparative Example 1

In accordance with the same procedure as in Example 1 except that 20 mg of dicyclopentadienylzirconium dichloride were used as a metallocene catalyst component, ethylene-styrene copolymerization was tried. However, the resulting polymer is polyethylene alone, and a copolymer of ethylene and styrene could not be prepared.

EXAMPLE 2

In accordance with the same procedure as in Example 1 except that 20 mg of ethylenebis(tetrahydro-1-indenyl) zirconium dichloride were used as a metallocene catalyst component, ethylene-styrene copolymerization was carried out. As a result, 12.4 g of a polymer were obtained. A styrene content in this polymer measured in the same manner as in Example 1 was 19.6 mole %, and any styrene-styrene chain was not present. An intrinsic viscosity ([η]) of the obtained polymer measured in a tetralin solution at 135° C. was 0.54 dl/g.

EXAMPLE 3

In accordance with the same procedure as in Example 1 except that 0.9 g of styrene was used, polymerization was carried out. As a result, 4.8 g of a polymer were obtained. A styrene content in this polymer measured in the same manner as in Example 1 was 2.1 mole %, and any styrene-styrene chain was not present.

According to the method of the present invention, an ethylene-aromatic vinyl compound random copolymer containing 0.1 to 50 mole % of an aromatic vinyl compound unit can be obtained in a good yield.

What is claimed is:

1. A method for preparing an ethylene copolymer which comprises the step of copolymerizing ethylene with an aromatic vinyl compound to obtain a random copolymer of ethylene and the aromatic vinyl compound that does not have an aromatic vinyl monomer-aromatic vinyl monomer chain, said copolymerizing being conducted in the presence of a catalyst comprising (A) a transition metal compound selected from the group consisting of ethylenebis(1-indenyl) zirconium dichloride, ethylenebis(tetrahydro-1-indenyl) zirconium dichloride, isopropylidene(cyclopentadienyl) (fluorenyl)zirconium dichloride, methylphenylmethylene (cyclopentadienyl)(fluorenyl)zirconium dichloride and diphenylmethylene(cyclopentadienyl)(fluorenyl)zirconium dichloride and (B) a cocatalyst.

2. The method according to claim 1 wherein said cocatalyst is an aluminoxane.

3. The method according to claim 2 wherein said aluminoxane is an aluminoxane having two or more kinds of alkyl groups.

4. The method according to claim 2 wherein said aluminoxane is a fine particle aluminoxane.

5. The method according to claim 1 wherein said cocatalyst is an aluminum oxycompound obtained by bringing an aluminoxane into contact with a compound having an active hydrogen.

6. The method according to claim 1 wherein said cocatalyst is a compound which can stabilize a cationic transition metal complex.

7. The method according to claim 1 wherein said cocatalyst is a compound showing Lewis acid properties.

8. The method according to claim 1 wherein said catalyst is used in the presence of an organic aluminum compound.

9. The method according to claim 8 wherein said catalyst comprising (A) and (B) is used in the presence of an organic aluminum compound which is represented by the formula (IV)

(wherein each of R' and R" is a hydrocarbon group having 1 to 20 carbon atoms, and R' and R" may be mutually identical or different; X is a halogen atom; j is an integer of from 1 to 3; each of k, l and m is 0, 1 and 2, and j+k+l+m=3).

10. The method according to claim 9 wherein said organic aluminum compound represented by the formula IV is triethyl aluminum or triisobutyl aluminum.

11. The method according to claim 1 wherein said aromatic vinyl compound is styrene, o-methylstyrene, p-methylstyrene, o,p-dimethylstyrene, o-ethylstyrene, m-ethylstyrene, p-ethylstyrene, o-chlorostyrene, p-chlorostyrene or α-methylstyrene.

12. The method according to claim 1 wherein polymerization temperature is in the range of from −100 to 200° C. and polymerization pressure is in the range of from atmospheric pressure to 100 kg/cm$^2$.

13. The method according to claim 2 wherein said aluminoxane is a compound represented by the formula II or III

-continued
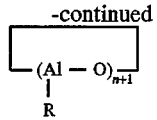
[III]
wherein R is a hydrocarbon group having 1 to 10 carbon atoms, and n is an integer of 2–100.
* * * * *